(12) United States Patent
Power, II et al.

(10) Patent No.: US 11,317,622 B2
(45) Date of Patent: *May 3, 2022

(54) TREE STAND ASSEMBLY

(71) Applicant: Tethrd LLC, Carver, MN (US)

(72) Inventors: Walter Ernest Power, II, Jordan, MN (US); Gregory Alan Godfrey, Richmond Hill, GA (US); Carl Eugene Kossuth, III, Jordan, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/167,797

(22) Filed: Feb. 4, 2021

(65) Prior Publication Data

US 2021/0204538 A1    Jul. 8, 2021

Related U.S. Application Data

(63) Continuation of application No. 16/732,427, filed on Jan. 2, 2020, now abandoned.

(51) Int. Cl.
*A01M 31/02* (2006.01)

(52) U.S. Cl.
CPC .................. *A01M 31/02* (2013.01)

(58) Field of Classification Search
CPC .................. A01M 31/02; A01M 31/025
See application file for complete search history.

(56) References Cited

U.S. PATENT DOCUMENTS

| | | | |
|---|---|---|---|
| 4,936,416 A * | 6/1990 | Garon | A01M 31/02 108/152 |
| 5,143,177 A | 9/1992 | Smith | |
| 6,386,321 B1 * | 5/2002 | Muhich | A01M 31/02 182/187 |
| 10,080,362 B1 * | 9/2018 | Alexander | A47C 9/10 |
| 10,412,954 B1 * | 9/2019 | Ellinghuysen | F41A 23/18 |
| 10,757,929 B1 * | 9/2020 | Hauser | A47C 7/029 |
| 2003/0127286 A1 | 7/2003 | Engstrom | |
| 2010/0236865 A1 * | 9/2010 | Crowton | E06C 1/26 182/129 |
| 2010/0300808 A1 * | 12/2010 | Hale | A01M 31/02 182/187 |
| 2011/0297481 A1 * | 12/2011 | Copus | A01M 31/02 182/113 |
| 2012/0080269 A1 * | 4/2012 | Furseth | A01M 31/02 182/187 |
| 2012/0125715 A1 * | 5/2012 | Furseth | E06C 7/081 182/194 |

(Continued)

*Primary Examiner* — Colleen M Chavchavadze
*Assistant Examiner* — Candace L Bradford

(57) ABSTRACT

A tree stand assembly includes a platform that has a front edge for engaging a tree. A post is attached to the platform adjacent to the front edge and extends upwardly therefrom. A bracket is attached to a front side of the post and has a top side, a bottom side and a perimeter surface extending between the top and bottom sides. The perimeter surface includes a front surface, a rear surface, a first lateral surface and a second lateral surface. The front surface has a plurality of teeth therein extending forward of the bracket to engage a tree. The rear surface includes a central section and a pair of outer sections positioned on opposite sides of the central section. The outer sections extend away from the front surface and the central section toward an associated one of the first and second lateral surfaces.

17 Claims, 4 Drawing Sheets

(56) References Cited

U.S. PATENT DOCUMENTS

| | | | |
|---|---|---|---|
| 2012/0199418 A1* | 8/2012 | Priest | A01M 31/02 182/129 |
| 2014/0166400 A1* | 6/2014 | Berkbuegler | A01M 31/02 182/129 |
| 2014/0190767 A1* | 7/2014 | Wheelington | A01M 31/02 182/129 |
| 2015/0034419 A1* | 2/2015 | Blackwell | A01M 31/02 182/187 |
| 2017/0265454 A1* | 9/2017 | Kramer | A01M 31/02 |
| 2019/0055782 A1* | 2/2019 | Infalt | A01M 31/02 |
| 2020/0253190 A1* | 8/2020 | D'Acquisto | A63B 27/00 |
| 2020/0305412 A1* | 10/2020 | Power, II | A01M 31/02 |
| 2021/0076666 A1* | 3/2021 | Power, II | F16M 13/022 |
| 2021/0187356 A1* | 6/2021 | D'Acquisto | A01M 31/02 |

* cited by examiner

TREE STAND ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tree mountable hunting platform devices and more particularly pertains to a new tree mountable hunting platform device having improved stability as well as additional footholds to facilitate movement around a tree on which the device is mounted.

(2) Description of Related Art Including Information Disclosed Under 37 CFR 1.97 and 1.98

The prior art relates to tree mountable hunting platform devices. While these devices include cleats for engaging a tree during a process referred to cam-locking, the cleats are typically small and only service the function of engaging a tree.

BRIEF SUMMARY OF THE INVENTION

An embodiment of the disclosure meets the needs presented above by generally comprising a platform that has a perimeter edge including a front edge having a shape configured to engage a tree. A post is attached to the platform adjacent to the front edge and extends upwardly from the platform. A bracket is attached to a front side of the post and is positioned distal to the platform. The bracket has a top side, a bottom side and a perimeter surface extending between the top and bottom sides. The perimeter surface includes a front surface, a rear surface, a first lateral surface and a second lateral surface. The front surface has a plurality of teeth therein extending forward of the bracket. The teeth are configured to engage a tree. The rear surface includes a central section and a pair of outer sections positioned on opposite sides of the central section. The outer sections extend away from the front surface and the central section toward an associated one of the first and second lateral surfaces.

In another embodiment a platform is provided that has a perimeter edge including a front edge having a shape configured to engage a tree. A post is attached to the platform adjacent to the front edge. The post extends upwardly from the platform. A bracket is attached to a front side of the post and is positioned distal to the platform. The bracket has a top side, a bottom side and a perimeter surface extending between the top and bottom sides. The perimeter surface includes a front surface, a rear surface, a first lateral surface and a second lateral surface. The front surface has a plurality of teeth therein extending forward of the bracket. The teeth are configured to engage a tree. Each of the first and second lateral surfaces are angled outwardly from the front surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
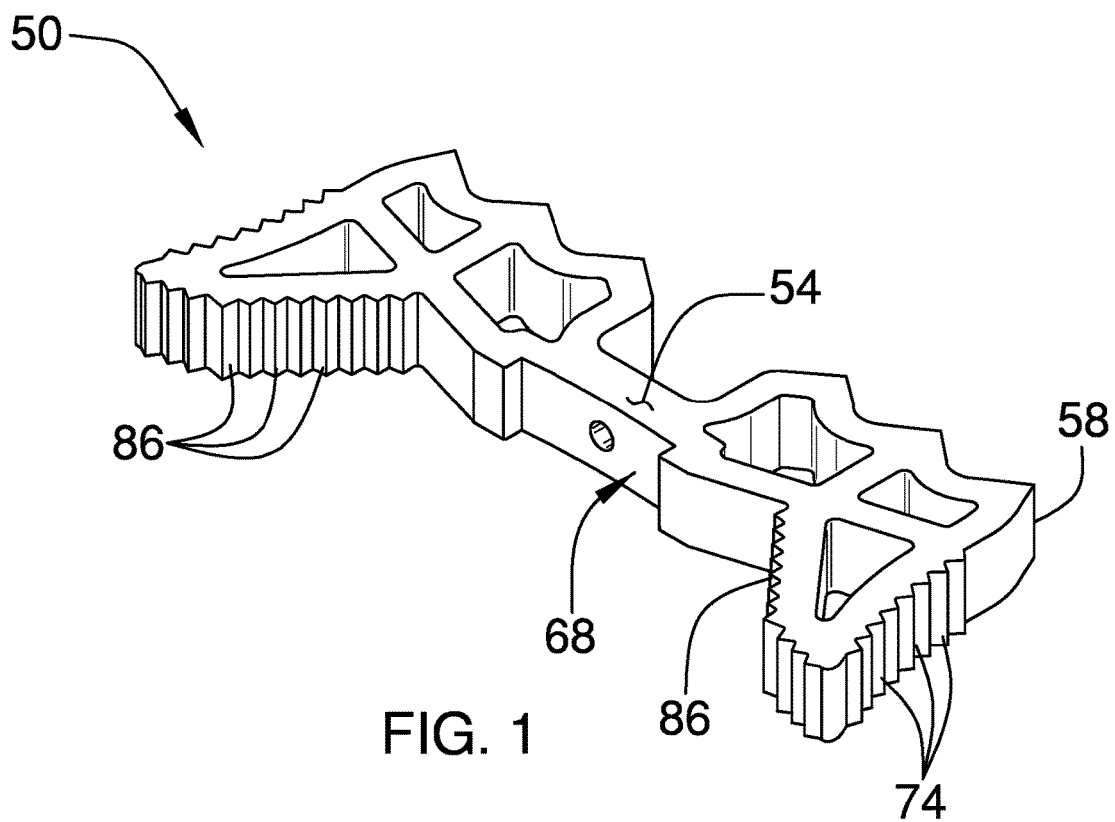
FIG. 1 is a top isometric view of a bracket of a tree stand assembly according to an embodiment of the disclosure.

With reference now to the drawings, and in particular to FIGS. 1 through 5 thereof, a new tree mountable hunting platform devices embodying the principles and concepts of an embodiment of the disclosure and generally designated by the reference numeral 10 will be described.

As best illustrated in FIGS. 1 through 5, the tree stand assembly 10 generally comprises a platform 12 that has a perimeter edge 14. The perimeter edge 14 includes a front edge 16, a rear edge 18, a first lateral edge 20 and a second lateral edge 22. The platform 12 has a top surface 24, a bottom surface 26 and an outer surface 28 positioned between the top 24 and bottom 26 surfaces. A plurality of gripping protuberances 38 extends outwardly away from the outer surface 28 of each of the first 20 and second 22 lateral edges. The front edge 16 has a receiving notch 30 therein spaced from the first 20 and second 22 lateral edges. The front edge 16 has a shape to receive a portion of a trunk of a tree 32. The front edge 16 includes a first section 34 positioned between the first lateral edge 20 and the receiving notch 30 and a second section 36 positioned between the second lateral edge 22 and the receiving notch 30. The first 34 and second 36 sections are angled inwardly from a respective one of the first 20 and second 22 lateral edges and toward the receiving notch 30.

A post 40 is attached to the platform 12 adjacent to the front edge 16. The post 40 extends upwardly from the platform 12. The post 40 is pivotally coupled to the platform 12 and extends into the notch 30 when the post 40 is in a vertical orientation extending upwardly from the platform 12. As can be seen in the Figures, the post 40 may be secured to mounts 44 extending upwardly from the platform 12, though the post 40 may be attached to the platform 12 in alternate locations. When the post 40 abuts an end wall 42 of the notch 30 as it is rotated upwardly, the end wall 42 retains the post 40 in an essentially perpendicular relationship with the platform 12.

Figure 5:
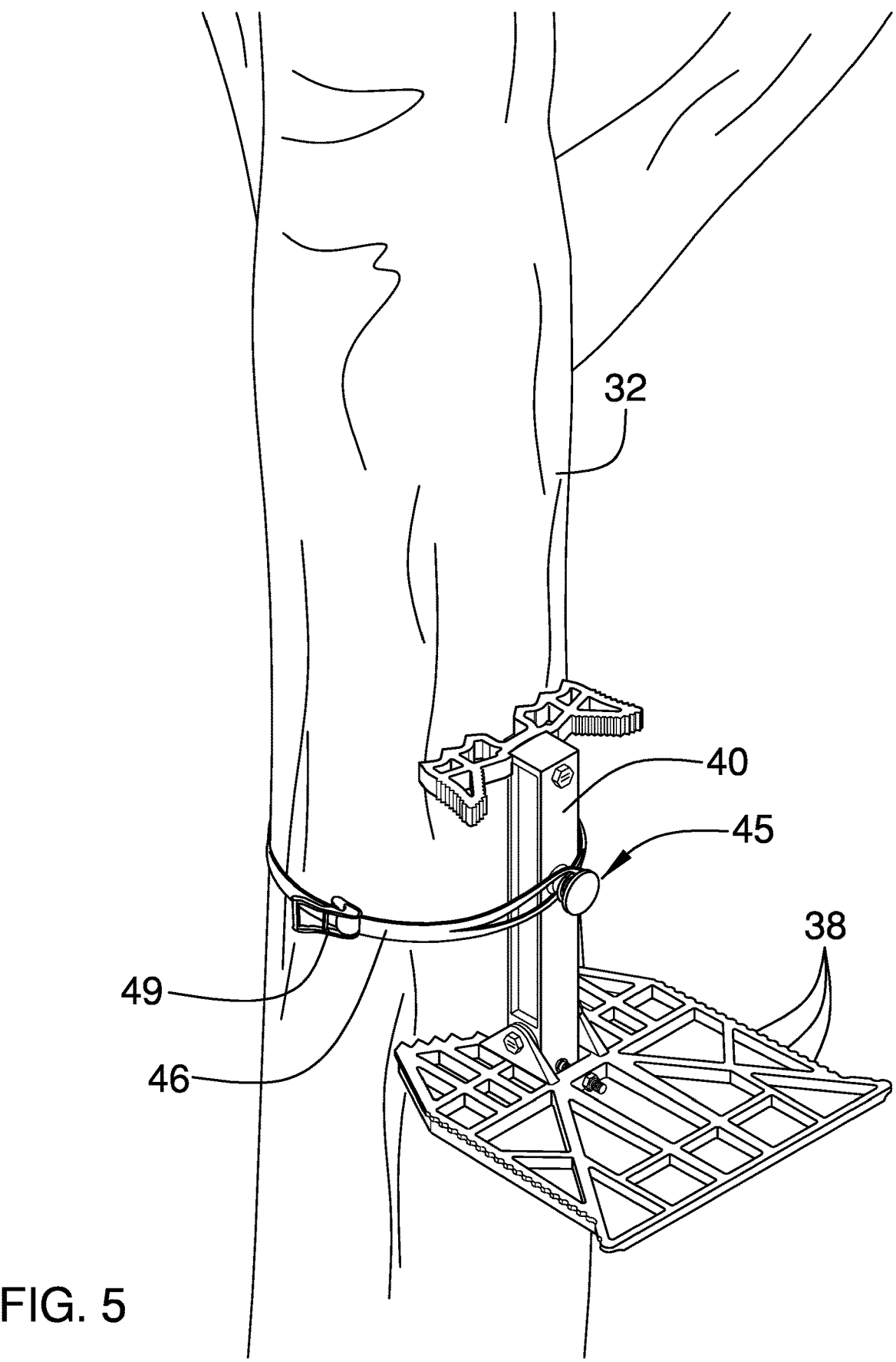
FIG. 5 is an in-use isometric view of an embodiment of the disclosure.

A catch 45 is attached to the post 40 and extends rearwardly therefrom. The catch 45 is configured to engage a strap 46 to secure the post 40 to the tree 32. As is shown in the Figures, the catch 46 may have a knob shape with a narrow portion 47 abutting the post 40 and a bulbous portion 48 positioned distal to the post 40. The bulbous portion 48 retains the strap 46 on the catch 45 by extending the catch 45 through loops on the strap 46. The strap 46 will include a buckle or ratcheting device 49 to tighten the strap 46 to secure the post 40 as shown in FIG. 5.

Figure 2:
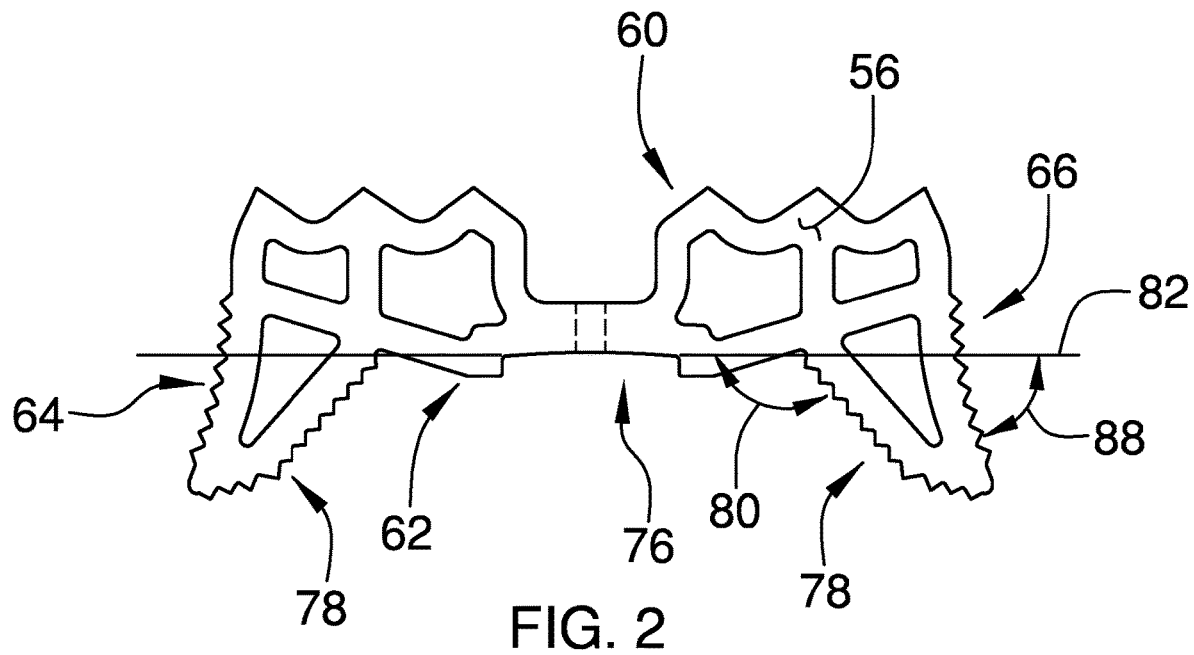
FIG. 2 is a bottom view of the bracket of an embodiment of the disclosure.
Figure 3:
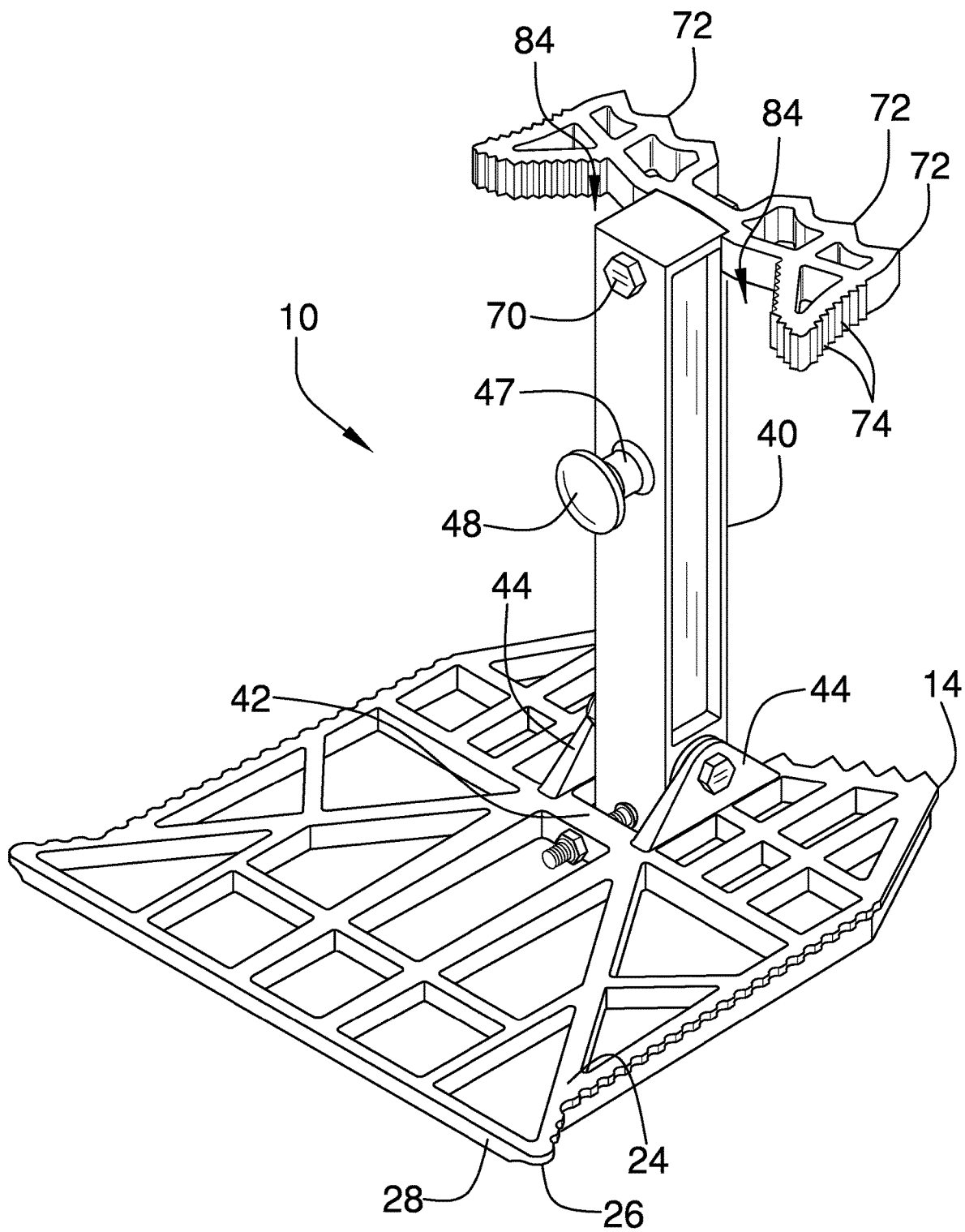
FIG. 3 is a rear isometric view of an embodiment of the disclosure.

A bracket 50 is attached to a front side 52 of the post 40 and is positioned distal to the platform 12. The bracket 50 will typically be comprised of a rigid material, such as a metallic material. The bracket 50 has a top side 54, a bottom side 56 and a perimeter surface 58 extending between the top 54 and bottom 56 sides. The perimeter surface 58 includes a front surface 60, a rear surface 62, a first lateral surface 64 and a second lateral surface 66. The rear surface 62 may have receiving indentation 68 as is shown in FIG. 2 to receive and seat the front side 52 of the post 40. The post 40 and bracket 50 may comprise a unitary structure, or a fastener 70 may extend through the post 40 and bracket 50 to secure the two together.

The front surface 60 has a length from the first lateral surface 64 to the second lateral surface 66 that is at least 4.0 inches. Typically, the front surface 60 will have a length of between 4.0 inches and 8.0 inches. This length provides for greater traction between the post 40 and the tree 32 to prevent movement of the assembly 10 relative to the tree 32. The front surface 60 has a plurality of teeth 72 therein extending forward of the bracket 50. The teeth 72 are configured to engage the tree 32 when the post 40 is in a deployed position extending upwardly from the platform 14. As can be seen in the Figures, the teeth 72 may be relatively large to allow for the teeth 72 to extend between edges of bark. Thus, each "tooth" may have width, measured laterally along a line extending between the first 64 and second 66 lateral surfaces, between 0.25 inches and 2.5 inches.

The first 64 and second 66 lateral surfaces extend rearwardly from the front surface 60 typically a distance of between 1.5 inches and 3.0 inches. In some variations, the distance may be as large as 5.0 inches. The first 64 and second 66 lateral surfaces form "wings" extending rearwardly from the front surface 60. The first 64 and second 66 lateral surfaces provide locations for a person to place a foot upon as the other foot is placed on the platform 14. This would typically occur when a person is attempting to pivot around a tree for positioning or taking aim at game. The first 64 or second 66 lateral surfaces thus provide greater balancing and stability for the user while they are attempting to use a bow or gun. In order to further facilitate a grip between the bracket 50 and the user's foot, the first lateral surface 64 and the second lateral surface 66 each have a plurality of protrusions 74 extending outwardly therefrom. The protrusions 74 may extend from the top side 54 to the bottom side 56 as shown in the in Figures.

The rear surface 62 of the bracket 50 includes, generally, a central section 76 and a pair of outer sections 78 positioned on opposite sides of the central section 76. The receiving indentation 68 is positioned in the central section 76. The outer sections 78 extend away from the front surface 60 and the central section 76 toward an associated one of the first 64 and second 66 lateral surfaces. Each of the outer sections 78 may form an obtuse angle with the central section 76, though, more particularly, the outer sections 78 form an obtuse angle 80 with an axis 82 that extends through first 64 and second 66 lateral surfaces at points where the outer sections 78 join the central section 76. As the outer sections 78 angle outwardly from the receiving indentation 68, a pair of receiving spaces 84 is defined between the post 40 and corresponding ones of outer sections 78. The user of the assembly 10 may place a foot in the receiving space to use the outer sections 78 as a toe-hold.

A plurality of projections 86 is positioned on the outer sections 78 to facilitate a grip between a person's foot and the outer sections 76. The projections 86 extend between the top 54 and bottom 56 sides and continue until they join the protrusions 74 on the first 64 and second 66 lateral surfaces such that a continuous surface of grip enhancement is formed throughout all areas on the bracket 30 that may come in contact with a person's foot, or more specifically the person's footwear. Thus, the projections 86 and protrusions 74 may comprise substantially identical structures. To further enhance traction, the first 64 and second 66 lateral surfaces may be angled outwardly from the front surface 60 such that they form an acute angle 88 with the axis 82. Moreover, the first 64 and second 66 lateral surfaces may be concavely arcuate, as can be seen in FIG. 2, to form a "hook" to engage a person's foot.

Figure 4:
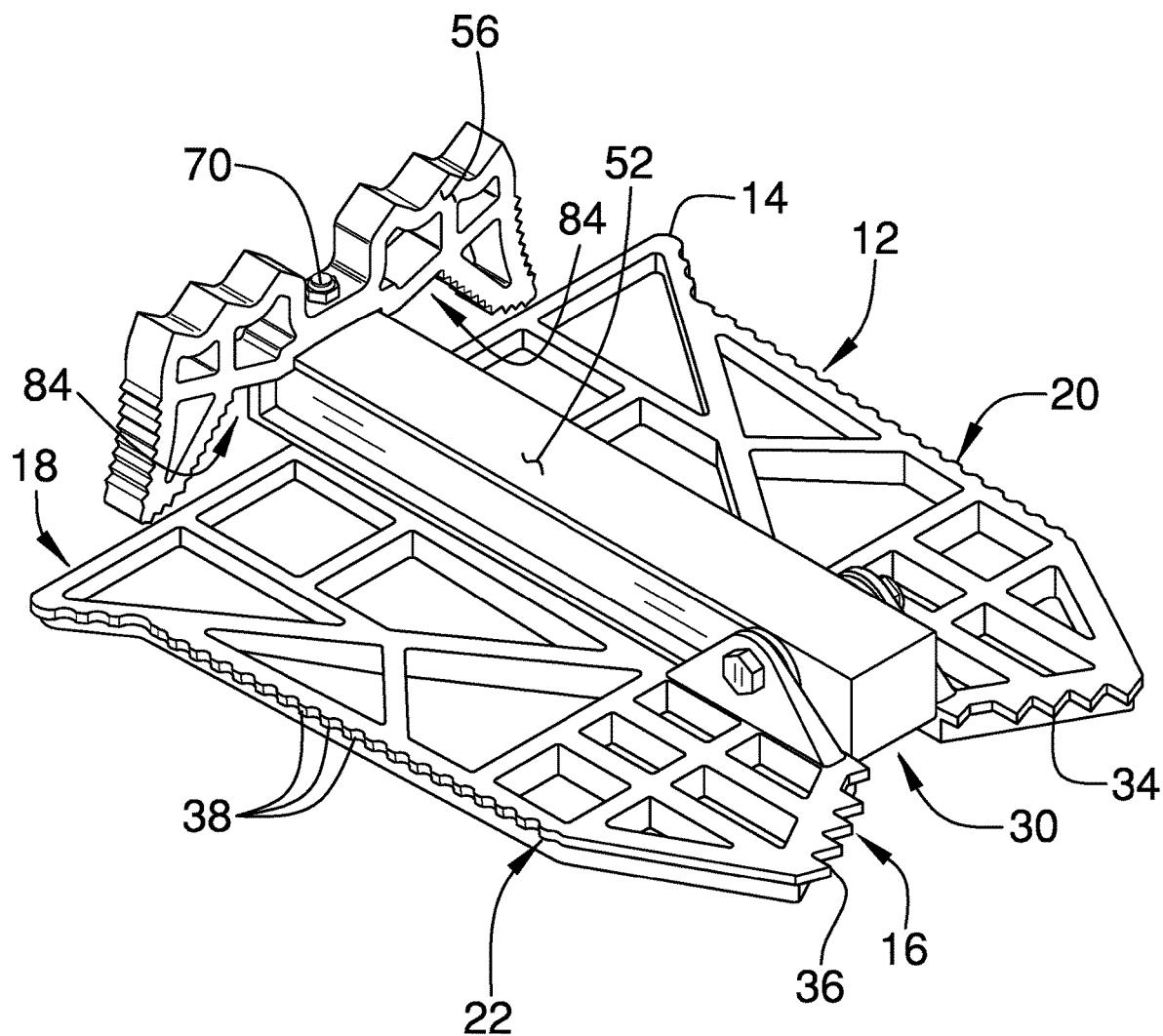
FIG. 4 is a front isometric view of an embodiment of the disclosure.

In use, the user will ascend the tree 32 to a desired height. At this point, the user will secure the post 40 to the tree 32 with the strap 46 as described above. While the strap 46 is being tightened, the platform 14 is in an upright position with the post 40 in the stored position as shown in FIG. 4. Once the strap 46 is fully tightened, the assembly 10 is pushed downwardly to further more securely tighten the assembly 10, and the bracket 50, against the tree 32. At this point, the user utilizes a move called "camming" or "cam locking" by pivoting the platform 14 downwardly such that its front edge 16 engages the tree 32. As the pivoting is occurring, the front edge 16 functions as a cam to pull the post 40 away from the tree 32 and thereby cause the bracket 50 to be biased against the tree 32 whereupon the user may securely stand upon the platform 14. The length of the bracket 50 provides a more secure engagement between the assembly 10 and the tree 32. The large surface area of the top side 54 assists a user in pushing the assembly 10 downward during the "cam locking" process described above.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A support assembly for standing on by person secured to a tree, the support assembly being configured to be removably securable to a tree, the support assembly including:
 a platform having a perimeter edge, the perimeter edge including a front edge having a shape configured to engage a tree;
 a post being attached to the platform adjacent to the front edge, the post extending upwardly from the platform;
 a bracket being attached to a front side of the post and being positioned distal to said platform, said bracket having a top side, a bottom side and a perimeter surface extending between said top and bottom sides, said perimeter surface including a front surface, a rear surface, a first lateral surface and a second lateral surface;
 said front surface having a plurality of teeth therein extending forward of said bracket, said teeth being configured to engage a tree;
 said rear surface including a central section and a pair of outer sections positioned on opposite sides of said central section wherein one of said outer sections abuts the first lateral surface and one of said outer sections abuts the second lateral surface, said outer sections of said rear surface extending in a rearward direction away from said front surface and toward an associated one of the first and second lateral surfaces, said outer sections extending in the rearward direction away from said central section such that a receiving space is formed between the said outer sections to facilitate receiving a person's foot; and
 wherein the first lateral surface and said second lateral surface each have a plurality of protrusions extending outwardly therefrom, said protrusions facilitating a grip between the person's foot and said first and second lateral surfaces.

2. The support assembly according to claim 1, wherein the perimeter edge includes a rear edge, a first lateral edge and a second lateral edge, the platform having a top surface, a bottom surface and an outer surface positioned between the top and bottom surfaces, a plurality of gripping protuberances extending outwardly away from the outer surface along each of the first and second lateral edges.

3. The support assembly according to claim 2, wherein the front edge has a receiving notch therein spaced from the first and second lateral edges, the post being pivotally coupled to the platform and extending into the receiving notch when the post is in a vertical orientation extending upwardly from the platform.

4. The support assembly according to claim 1, further including a catch being attached to said post and extending rearwardly therefrom, said catch being configured to engage a strap to secure the post to a tree.

5. The support assembly according to claim 1, wherein said front surface has a length from said first lateral surface to said second lateral surface being at least 4.0 inches.

6. The support assembly according to claim 1, wherein said first and second lateral surfaces extend rearwardly from said front surface a distance of between 1.5 inches and 3.0 inches.

7. The support assembly according to claim 1, wherein each of said outer sections forms an obtuse angle with an axis of said bracket extending through said first and second lateral surfaces.

8. The support assembly according to claim 1, further including a plurality of projections being positioned on said outer sections to facilitate a grip between the person's foot and said outer sections.

9. The support assembly according to claim 1, wherein each of said first and second lateral surfaces is angled outwardly from said front surface.

10. A support assembly for standing on by person secured to a tree, the support assembly being configured to be removably securable to a tree, the support assembly including:
 a platform having a perimeter edge, the perimeter edge including a front edge having a shape configured to engage a tree;
 a post being attached to the platform adjacent to the front edge, the post extending upwardly from the platform;
 a bracket being attached to a front side of the post and being positioned distal to said platform, said bracket having a top side, a bottom side and a perimeter surface extending between said top and bottom sides, said perimeter surface including a front surface, a rear surface, a first lateral surface and a second lateral surface;
 said front surface having a plurality of teeth therein extending forward of said bracket, said teeth being configured to engage a tree;
 each of said first and second lateral surfaces is angled outwardly from said front surface;
 said rear surface including a central section and a pair of outer sections positioned on opposite sides of said central section wherein one of said outer sections abuts the first lateral surface and one of said outer sections abuts the second lateral surface, said outer sections of said rear surface extending in a rearward direction away from said front surface and toward an associated one of the first and second lateral surfaces, said outer sections extending in the rearward direction away from said central section such that a receiving space is formed between the said outer sections to facilitate receiving a person's foot; and
 a plurality of projections being positioned on said outer sections to facilitate a grip between the person's foot and said outer sections.

11. The support assembly according to claim 10, wherein the perimeter edge includes a rear edge, a first lateral edge and a second lateral edge, the platform having a top surface, a bottom surface and an outer surface positioned between the top and bottom surfaces, a plurality of gripping protuberances extending outwardly away from the outer surface along each of the first and second lateral edges.

12. The support assembly according to claim 11, wherein the front edge has a receiving notch therein spaced from the first and second lateral edges, the post being pivotally coupled to the platform and extending into the receiving notch when the post is in a vertical orientation extending upwardly from the platform.

13. The support assembly according to claim 10, further including a catch being attached to said post and extending rearwardly therefrom, said catch being configured to engage a strap to secure the post to a tree.

14. The support assembly according to claim 10, wherein said front surface has a length from said first lateral surface to said second lateral surface being at least 4.0 inches.

15. The support assembly according to claim 10, wherein said first and second lateral surfaces extend rearwardly from said front surface a distance of between 1.50 inches and 3.0 inches.

16. The support assembly according to claim 10, wherein the first lateral surface and said second lateral surface each have a plurality of protrusions extending outwardly therefrom, said protrusions facilitating a grip between a person's foot and said first and second lateral surfaces.

17. A support assembly for standing on by person secured to a tree, the support assembly being configured to be removably securable to a tree, the support assembly including:

a platform having a perimeter edge, the perimeter edge including a front edge having a shape configured to engage a tree;

a post being attached to the platform adjacent to the front edge, the post extending upwardly from the platform;

a bracket being attached to a front side of the post and being positioned distal to said platform, said bracket having a top side, a bottom side and a perimeter surface extending between said top and bottom sides, said perimeter surface including a front surface, a rear surface, a first lateral surface and a second lateral surface;

said front surface having a plurality of teeth therein extending forward of said bracket, said teeth being configured to engage a tree;

said rear surface including a central section and a pair of outer sections positioned on opposite sides of said central section, said outer sections extending away from said front surface and said central section toward an associated one of said first and second lateral surfaces, wherein a receiving space is formed between the said outer sections to facilitate receiving a person's foot; and a plurality of protrusions being positioned on said outer sections to facilitate a grip between the person's foot and said outer sections, said protrusions on said outer sections being positioned in the receiving space and being directed toward each other.

* * * * *